US012235627B2

(12) United States Patent
Reynolds et al.

(10) Patent No.: US 12,235,627 B2
(45) Date of Patent: Feb. 25, 2025

(54) VARIABLE REDUCTION FOR INDUSTRIAL AUTOMATION ANALYTICS AND MACHINE LEARNING MODELS

(71) Applicant: Rockwell Automation Technologies, Inc., Mayfield Heights, OH (US)

(72) Inventors: Jordan C. Reynolds, Austin, TX (US); John J. Hagerbaumer, Mequon, WI (US); Troy W. Mahr, Pleasant Prairie, WI (US); Thomas K. Jacobsen, Wake Forest, NC (US); Giancarlo Scaturchio, Pisa (IT)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 250 days.

(21) Appl. No.: 17/484,720

(22) Filed: Sep. 24, 2021

(65) Prior Publication Data

US 2023/0100333 A1 Mar. 30, 2023

(51) Int. Cl.
G05B 19/418 (2006.01)

(52) U.S. Cl.
CPC .......... *G05B 19/41835* (2013.01); *G05B 2219/31229* (2013.01)

(58) Field of Classification Search
CPC .... G05B 19/41835; G05B 2219/31229; G05B 19/4188; G05B 2219/13144;

(Continued)

(56) References Cited

U.S. PATENT DOCUMENTS 10,783,162 B1\* 9/2020 Montague ........... G06F 16/2465
2011/0302654 A1\* 12/2011 Miettinen ............. G06F 21/552
726/23

(Continued)

FOREIGN PATENT DOCUMENTS

CN 110083079 A 8/2019

OTHER PUBLICATIONS

Sun, Ruimin, "SoK: Attacks on Industrial Control Logic and Formal Verification-Based Defenses," 2021 IEEE European Symposium on Security and Privacy, pp. 1-18.

(Continued)

*Primary Examiner* — Kenneth M Lo
*Assistant Examiner* — Mohammed Shafayet

(57) ABSTRACT

Various embodiments of the present technology generally relate to solutions for improving industrial automation programming and data science capabilities with machine learning. More specifically, embodiments include systems and methods for implementing machine learning engines within industrial programming and data science environments to improve performance, increase productivity, and add functionality. In an embodiment, a system comprises a machine learning-based analysis engine configured to perform an analysis of operational data from an industrial automation environment. The analysis engine is further configured to perform an analysis of control logic and identify, based on the analysis of the operational data and the analysis of the control logic, a variable that is in the control logic but is not used in the operational data. The system further comprises a notification component configured to surface a notification that the variable is in the control logic but is not used in the operational data.

17 Claims, 13 Drawing Sheets

(58) Field of Classification Search
CPC ........... G05B 2219/23258; G05B 2219/31342; G05B 2219/32128; G05B 19/0426
See application file for complete search history.

(56) References Cited

U.S. PATENT DOCUMENTS

| | | | |
|---|---|---|---|
| 2013/0006395 A1* | 1/2013 | Plache | G06F 3/04842 700/83 |
| 2013/0131840 A1* | 5/2013 | Govindaraj | G05B 19/41845 700/19 |
| 2019/0072943 A1* | 3/2019 | Przybylski | G06Q 10/06 |
| 2019/0095449 A1* | 3/2019 | Uppunda | G06F 16/116 |
| 2020/0103873 A1* | 4/2020 | Stump | G05B 19/41845 |
| 2021/0208545 A1* | 7/2021 | Zhang | G05B 13/042 |

OTHER PUBLICATIONS

Extended European Search Report mailed by the European Patent Office for application No. 22196136.0 on Jan. 30, 2020, pp. 1-10.

* cited by examiner

VARIABLE REDUCTION FOR INDUSTRIAL AUTOMATION ANALYTICS AND MACHINE LEARNING MODELS

BACKGROUND

Industrial manufacturing environments generate huge quantities of data at very fast speeds making the extraction of enterprise-level insights challenging. In industrial automation environments, control systems are used to drive various operations along an industrial line. Control code is used by industrial drives or programmable logic controllers to drive industrial assets, devices, and sensors in an industrial process. Operational data produced during runtime contains important information about inputs, outputs, operations, status, performance, or quality of the industrial process, but can be difficult to leverage in control code programming given the enormous amount of computing power and time that goes into data science and data analytics. Moreover, control programs are typically developed by programmers without access to or with limited access to runtime data, statistics, or the like. Important integrations, dependencies, variables, inputs, or outputs can be easily overlooked by control programmers because of the lack of accessibility to useful operational information. Moreover, an industrial process may have thousands of relevant variables, making it difficult for programmers to adequately provide connections and logic for every important variable, tag, or device. Manually editing control programs in response to various information in operational data can be an extremely difficult and time-consuming process that requires intimate knowledge of data science, data analytics, and process control. Data scientists face similar challenges in that they may be provided enormous amounts of operational data from one or more industrial automation environments with which they may wish to perform data mining, data processing, predictive modeling, or visualization, but the data scientist likely has no insight into the control logic or the industrial automation environment itself.

Machine learning algorithms are designed to recognize patterns and automatically improve through training and the use of data. Many different types of machine learning models exist including classification models, regression models, clustering models, dimensionality reduction models, and deep learning models. Examples of machine learning algorithms include artificial neural networks, nearest neighbor methods, decision trees, ensemble random forests, support vector machines (SVMs), naïve Bayes methods, regressions, and more. A machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of machine learning algorithms is their ability to learn by example, rather than needing to be manually programmed to perform a task, especially when the tasks would require a near-impossible amount of programming to perform the operations in which they are used.

It is with respect to this general technical environment that aspects of the present disclosure have been contemplated. Furthermore, although a general environment is discussed, it should be understood that the described examples should not be limited to the general environment identified in the background.

OVERVIEW

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to solutions for improving industrial automation programming and data science capabilities with machine learning. More specifically, embodiments of the present technology include systems and methods for implementing machine learning engines within industrial programming and data science environments to improve performance, increase productivity, and add functionality. In an embodiment of the present technology, a system comprises a memory that stores executable components and a processor, operatively coupled to the memory, that executes the executable components. The executable components comprise a machine learning-based analysis engine configured to perform an analysis of operational data from an industrial automation environment. The machine learning-based analysis engine is further configured to perform an analysis of control logic for controlling the industrial automation environment. The machine learning-based analysis engine is further configured to identify, based on the analysis of the operational data and the analysis of the control logic, a variable that is in the control logic but is not used in the operational data. The executable components further comprise a notification component configured to surface a notification that the variable is in the control logic but is not used in the operational data.

In some embodiments, the notification comprises a recommendation to remove the variable from the control logic. The executable components may further comprise a programming component configured to, in response to an input accepting the recommendation to remove the variable from the control logic, remove the variable from the control logic. The executable components may further comprise a determination component configured to determine that the notification should be surfaced based on a frequency of utilization of the variable in control logic for controlling industrial automation environments of the same type as the industrial automation environment. In some examples, the frequency of utilization of the variable is determined based on information derived from one or more control code repositories to which the system is communicatively coupled. Identifying the variable may comprise providing the operational data and the control logic as input to one or more machine learning models of the machine learning-based analysis engine. Identifying the variable may further comprise receiving an output from the one or more machine learning models identifying the variable.

In another embodiment, a non-transitory computer-readable medium has stored thereon instructions that, in response to execution, cause a system comprising a processor to perform operations. The operations comprise, performing in a machine learning-based analysis engine, an analysis of operational data from an industrial automation environment. The operations further comprise: performing, in the machine learning-based analysis engine, an analysis of control logic for controlling the industrial automation environment; identifying, in the machine learning-based analysis engine and based on the analysis of the operational data and the analysis of the control logic, a variable that is in the control logic but is not used in the operational data; and surfacing a notification that the variable is in the control logic but is not used in the operational data.

In yet another embodiment, a method of recommending the removal of variables in an industrial automation programming environment comprises performing, by a system comprising a processor, an analysis of operational data from an industrial automation environment and performing, by the system, an analysis of control logic for controlling the industrial automation environment. The method further comprises identifying, by the system and based on the analysis of the operational data and the analysis of the control logic, a variable that is in the control logic but is not used in the operational data and surfacing, by the system, a notification that the variable is in the control logic but is not used in the operational data

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
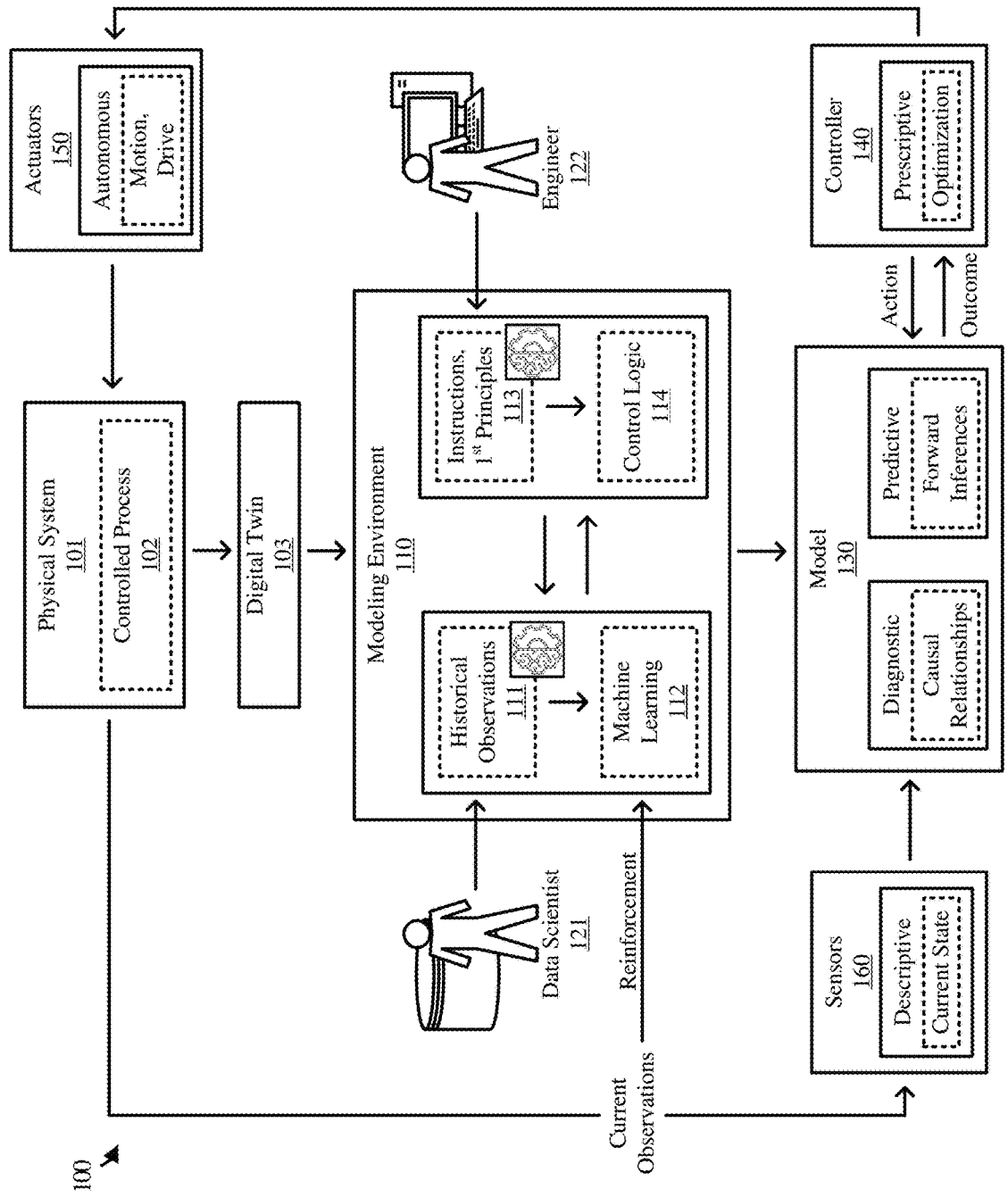
FIG. 1 illustrates an overview of an industrial automation environment in which aspects of the present technology are implemented.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to solutions for improving industrial automation programming and data science capabilities with machine learning. More specifically, embodiments of the present technology include systems and methods for implementing machine learning engines within industrial programming and data science environments to improve performance, increase productivity, and add functionality. Generally, industrial control logic provides instructions for controlling and performing certain operations within an industrial environment via controllers (e.g., programmable logic controllers or "PLCs"), wherein the controllers execute the control code to control downstream devices and machinery. Engineers and/or programmers are generally responsible for generating the control logic used to drive industrial processes. Data scientists are generally responsible for analyzing and processing operational data produced by the industrial automation environment to find important correlations, build models, create visualizations, and generally produce information that may be useful at the enterprise level, control level, or the field level. The present technology serves to bring these environments together such that engineers may utilize operational data in a useful manner to improve control logic programming and data scientists may utilize control logic and modeling data to improve their analytic capabilities.

Thus, the present technology serves to greatly enhance engineering and data science in industrial automation contexts by integrating their environments along with machine learning-based tools for assisted programming and assisted data analytics. In some embodiments, a machine learning-assisted programming environment is provided such that an engineer or programmer may be presented with recommended components, connections, and the like as they create code. In some examples, a machine learning-based engine (i.e., a "wizard") may suggest automatic completions ("auto-completions") of code, wherein a suggested auto-completion may include one or more components and connections.

Suggested auto-completions may also include configurations or settings for components of the control code. A machine learning model, in an embodiment, consumes data from existing control code in the programming environment, or the integrated development environment (IDE), to create suggestions or automatic completions. As an engineer writes control logic, the auto-complete program may suggest useful or relevant tags or surface relevant data in the context of the controlled process. The auto-complete program, in some embodiments, uses historical operational data to inform suggestions it makes in the programming environment.

In addition to suggestions and auto-completions, the programming environment, in an embodiment, provides access to operational data as well as data science tools (e.g., data analysis tools, data presentation tools, data mining tools, modeling tools, etc.) for the user and/or the machine learning engine to use during a programming session. Operational data, in some examples, includes data from the industrial automation environment that the control code is used in. In other examples, the operational data includes data from other environments that may be similar to the environment in which the control code will be implemented.

Moreover, in addition to operational data and data science tools being accessible from within the automation engineering environment or IDE, the present technology provides for automation engineering tools and data to be accessible from within a data science environment. A data science environment, as described herein, may include any computing environment in which data scientist functions, data analyst functions, data architect functions, statistician functions, database administrator functions, business analyst functions, or data and analytics manager functions may be performed. Such functions may include but are not limited to data mining, data modeling, predictive modeling, visualization, statistics, machine learning development, spreadsheet tools, systems development, enterprise resource planning, and business or enterprise-level intelligence. In an example, a data scientist may be presented with operational data collected from one or more industrial automation sites in an analytics environment while trying to mine for correlations and patterns. However, the data provides little to no information or context about the control logic, models, assets, or the like that produced the data. Thus, the data scientist may, in an example, select a piece of data and be presented with information, diagrams, or models relevant to the data. For example, a control diagram for a region proximate or in connection with a component that produced the particular chunk of data may be surfaced. In another example, a pipeline of data feeding into or out of the particular chunk of data may be surfaced. Other contextual information relevant to data that is typically available in a data science environment may be similarly surfaced, either through selection of a piece of data, selection of a menu that may provide contextual data, automatically surfaced, or the like. In an exemplary embodiment, surfacing relevant contextual data is performed in part by a machine learning-based context engine that identifies what contextual data is relevant to the particular chunk of data.

In accordance with the present disclosure, an industrial asset library and wizard are provided in an industrial programming and/or automation engineering environment. An industrial asset library, in an example, provides a list of industrial assets including but not limited to models, controllers, sensors, actuators, and other devices and allows a user to choose and configure an asset. In some examples, the asset library presents for a user a list of only relevant assets that may be useful based on the control logic or target industrial environment, wherein determining which assets to include in the asset library is achieved via a machine learning engine trained to identify relevant assets based on the industrial environment and/or control logic. In another example, the industrial asset library is accessible to and used by a machine learning-based recommendation engine (i.e., the "wizard") such that the recommendation engine can generate recommendations or auto-completions for the control logic.

In some examples, the industrial asset library includes a library of machine learning models specific to industrial automation applications, wherein the library of machine learning models is accessible to automation engineers and the wizard. The library, in an embodiment, bucketizes inputs based on categories. As an example, categories that may be used to bucketize inputs include but are not limited to tag data, physical input devices, environmental inputs, economic or other macro-environment inputs, and cyclical or seasonal inputs. To provide relevant inputs, arrays of different assets and/or characteristics may be utilized to assist automation engineers in finding valuable inputs to include in their logic.

The wizard, in accordance with the present technology, helps integrate models, variables, inputs, tags, and the like into the control code. The wizard is a machine learning-backed recommendation and configuration engine that helps choose models, variables, inputs, tags, and the like as well as provides assistance with tag linking and input/output (I/O) linking. The one or more machine learning models of the wizard are streamed data to generate its predications, wherein the data may come from many different places including the live industrial environment or network databases. In one example, the wizard may provide a user with a "short list" of variables that the engineer may want to control, wherein the short list is a subset of a full list of available variables.

In an example, an engineer or programmer may add an asset to the programming code in the programming environment. The wizard may then provide a list of tags that are related to the asset, available for linking to the asset, or commonly linked to the asset. Similarly, the engineer may choose to open a truncated list of tags from the library without the use of the recommendation wizard. The machine learning engine may, based on a starting set of devices, provide the engineer with the standard set of devices for a particular type of asset in the code. In another example, an engineer may be building a pipeline for a machine learning model they are implementing in the control code. In this example the wizard or asset library may be used to pull together the assets that should be used to make the machine learning model operable. The library or wizard may also suggest environmental factors, such as ambient air temperature, that are impactful in the data pipeline. Moreover, the wizard may be used to alert an engineer of any inconsistencies in the control code that may prevent it from functioning properly.

In addition to the wizard and library, the present disclosure contemplates the addition of other data science tools into the IDE or programming environment. For example, operational data and industrial environment data may be accessible from within the IDE. In an example, an automation engineer using the IDE may be building control logic for a production line. While the programming environment provides information about the flow of the process, it also provides access to the historical data stream for the production line, such as the data for each tag and process object in the line. The engineer may select a tag, and a machine learning-based engine may identify inputs and tags upstream of the selected tag that likely have an influence on that tag. In this way, the engineer can rapidly find relevant data in the context of the process from within their IDE. The engineer can then assess the relevance of data points to what they are trying to improve.

The present disclosure also contemplates the flip side of the previously discussed technology: the inclusion of contextual information from the programming and/or industrial environments in the data science environment. By integrating information from the programming and/or industrial environments into the data science environment, a data scientist may have far more contextual information for the data they are working with than they traditionally would. In this enhanced data science environment, connections may exist between the data science environment and the operational environment. In an exemplary embodiment, the data science environment includes an application programming interface (API) into the live environment, providing contextual information about a selected tag or column of data in some examples.

A data scientist, in an example, may receive a dump of data from which they seek to find relationships, correlations, patterns, and the like that can be used later to design models. A data scientist may wish to determine which tags, datapoints, sensors, and instrumentation are relevant to solve a problem based on the statistical analysis of data. The lack of contextual information, however, may severely limit the ability of a data scientist to find important data and design effective models. Thus, integrating the data scientist's environment with the programming environment, along with machine learning-based programs, allows hints and other contextual information to be surfaced for a data scientist. Contextualizing the data with specific process steps, assets, equipment, I/O nodes, and the like allows a data scientist to accelerate the feature selection process and identify which datapoints are relevant to a particular problem. This allows for a more streamlined and targetted data science process than mining for correlations in a non-contextualized dataset. In another example, statistics from sensor data may indicate that there is a heavy reliance one I/O node versus another. Surfacing such information about the different nodes can improve understanding and awareness of the automation process by the data scientist.

In some embodiments, the programming environments and data science environments previously described are integrated into a singular, multi-purposeful environment such that the engineering and data science disciplines can effectively collaborate. In this way, a process engineer who is defining control logic for a line or asset, can leverage data science capabilities or collaborate with a data scientist to program the control logic in a more robust manner.

Embodiments of the described technology may be implemented to perform variable relationship discovery. Variable relationship discovery may include finding correlations between variables, which is traditionally a manual process in which engineers use their own judgment to select variables that they think should be included in the process. However, when shifting to big data, it becomes far more difficult to identify how variables are related or correlated. Thus, in accordance with the present disclosure, machine learning models are used within the programming environment to help find potentially useful variables, models, or components for an industrial line.

A relationship discovery engine comprising one or more machine learning models is used to analyze control code and consume data to identify which variables have a large impact on the process and important variable relationships. The data consumed may, in some embodiments, include operational data. A machine learning-based engine may be used to identify a variable that is heavily used in a particular industrial process but is not being used or is barely used in the control code. The programming environment thus notifies a user that the variable has been potentially overlooked and/or recommends the addition of the variable.

In an example, a machine learning-based engine is used to determine that humidity is predictive of temperature increases in the industrial automation environment, but that a humidity variable is not included in the control code. Thus, a recommendation to add the humidity variable to the control logic is surfaced. In response to an acceptance of the recommendation, the variable may be added to the control logic and configured. In another example, variable relationship discovery is performed with respect to big data mining and data repositories. In such an example, a machine learning-based engine analyzes a code repository to determine dominant variables in a codebase. In certain implementations, the engine may look at various types of data available in the code base, including, in some instances, a comment section. Thus, when an engineer is programming an industrial line with the assistance of a machine learning engine, the engine may recognize that there are 100 tags available and three of them have not been used anywhere in the code. The engine further recognizes that those three missing tags are used in many other code repositories and informs the user of how the tags are typically used.

In some examples the machine learning-based engine is used to recommend the insertion of a loop, a function, a variable, or the like as well as input to the component and assistance with configuring and/or connecting the component in the control code. Conversely, a machine learning-based engine may identify that a variable that is heavily used in the control code is absent or under-used in the data pipeline, suggesting that its inclusion in the pipeline and model may yield better predictions.

Embodiments of the described technology may be further implemented to perform variable reduction. If, during runtime, extra variables are being output by the control logic that are not needed, computing power and storage are wasted. Data pipelines that are over-inclusive waste storage space and processing power, and extraneous data may reduce the predictive capability of some models. Thus, a machine learning-based engine may be used to inform, during a programming session, that a variable that is in the control program is not commonly used, isn't generally useful, or isn't useful in the particular industrial line based on historical process data. The engine may therefore recommend removing the variable from the control logic or automatically analyze datasets for extraneous data and eliminate the data from the pipeline.

In accordance with the present disclosure, a machine learning model comprises one or more machine learning algorithms that are trained based on historical data and/or training data. A machine learning model may employ one or more machine learning algorithms through which data can be analyzed to identify patterns, make decisions, make predictions, or similarly produce output that can inform control code and/or parameters. Different types of machine learning models may be used in accordance with the present technology including but not limited to classification models, regression models, clustering models, dimensionality reduction models, and deep learning models. Examples of machine learning algorithms that may be employed solely or in conjunction with one another include artificial neural networks, nearest neighbor methods, decision trees, ensemble random forests, support vector machines (SVMs), naïve Bayes methods, regressions, or similar machine learning techniques or combinations thereof capable of predicting output based on input data. Determining which machine learning methods to use may depend on the specific purpose or functions required for a particular industrial setting, the specific programming application used, or similar requirements. A machine learning engine, in some examples, outputs a prediction about what components might be beneficial to add or remove from the control logic. Similarly, a machine learning engine may output a recommendation to add or remove one or more components from the control logic, or a notification that a component that should be used or is typically used is missing. In other examples the machine learning engine outputs the predicted components or settings directly for integration into the control code. In yet another example, a machine learning engine provides a model of the control code or the industrial automation environment in such a way that a data scientist may use the contextual information to inform their analyses. Other outputs with a similar purpose may exist and are contemplated herein.

FIG. 1 illustrates an overview of an industrial automation environment wherein engineering and data science environments are integrated as described herein. FIG. 1 includes automation environment 100. Automation environment 100 comprises physical system 101 including controlled process 102. Automation environment 100 further comprises digital twin 103 and modeling environment 110. Modeling environment 110 comprises historical observations 111, machine learning 112, instructions and first principles 113, and control logic 114. Automation environment 100 further comprises data scientist 121, engineer 122, model 130, controller 140, actuators 150, and sensors 160.

In the example of FIG. 1, digital twin 103 of physical system 101 is provided to modeling environment 110, wherein modeling environment 110 is used by both data scientist 121 and engineer 122. In one embodiment, data scientist 121 accessed modeling environment 110 through a different application than engineer 122. In an alternative embodiment, data scientist 121 and engineer 122 use the same application for their data science and engineering purposes. In either embodiment, information from the data science portion of the modeling environment and the engineering portion of the modeling environment is shared and accessible for both functions—data scientist 121 can access contextual engineering data in performing data science tasks and engineer 122 can access operational data and data science tools. As shown, a machine learning-based engine is provided in both the engineering environment and the data science environment. Functionality of the machine learning-based engines may include generating recommendations, auto-completion functionality, providing contextual information, and other functionalities described herein. Instructions and first principles 113 is used to generate control logic 114. Engineer 122 may utilize operational data or similar from the data science environment in producing both instructions and first principles 113 and control logic 114. In some examples, a machine learning-based recommendation engine recommends adding components or editing control logic based in part on historical observations 111 and machine learning 112.

Model 130 is representative of one or more machine learning models implemented in control code for controlling controlled process 102. The one or more machine learning models may include predictive models for generating forward inferences and diagnostic models for identifying causal relationships. Model 130 includes one or more machine learning models that produces control logic as output for controller 140. Controller 140 runs one or more prescriptive models for optimizing controlled process 102 or a portion of controlled process 102. Controller 140 controls actuators 150 which actuate physical system 101 to perform controlled process 102. Actuators 150 comprise one or more machine learning models for autonomous driving of physical system 101. Sensors 160 collect data from physical system 101 running controlled process 102. Sensors 160 comprise one or more machine learning models for describing output and current state from controlled process 102. Output from controlled process 102 is also provided to modeling environment 110 and may be used for data science and/or engineering purposes.

Figure 2:
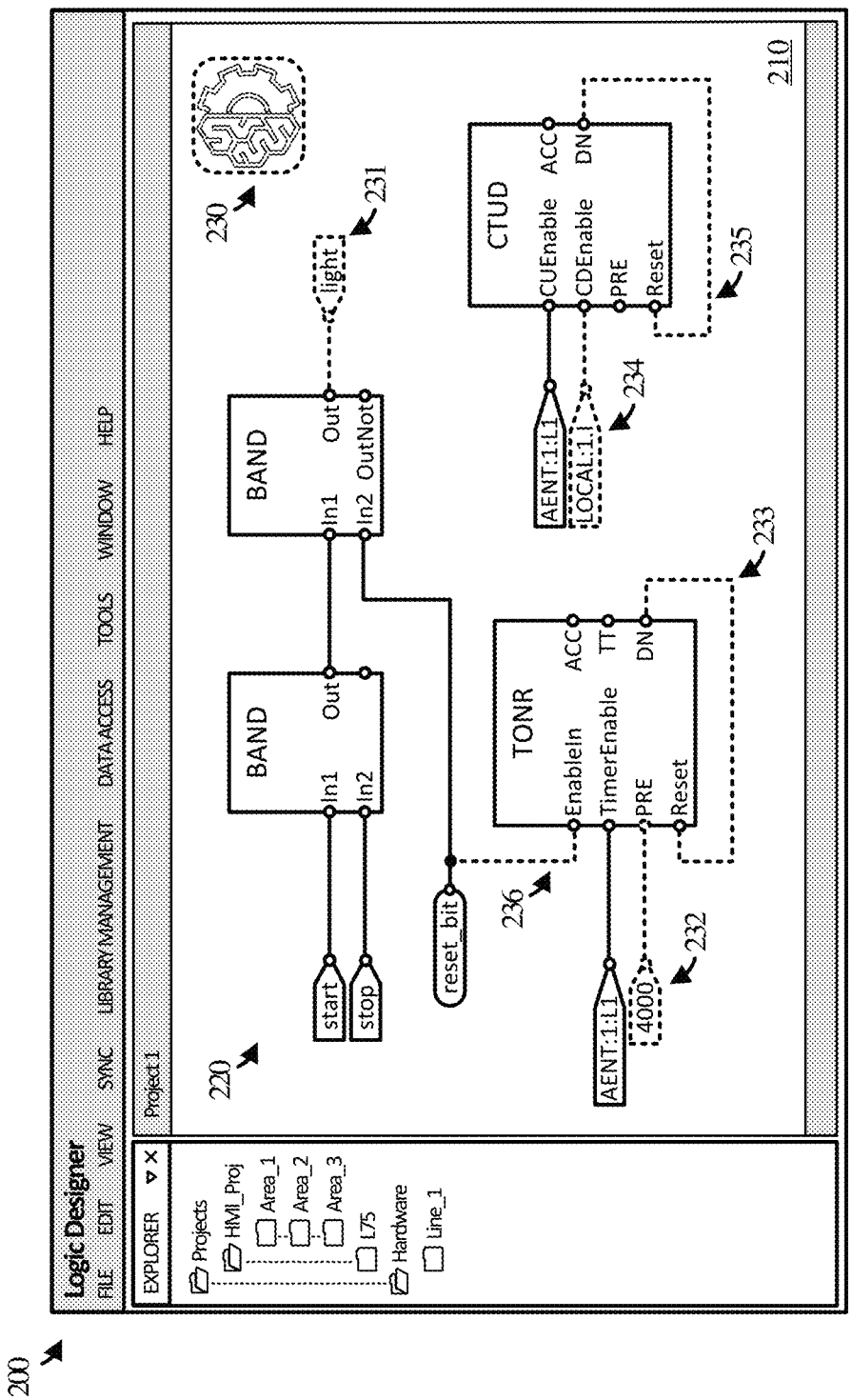
FIG. 2 illustrates a user interface environment for programming control logic in accordance with some embodiments of the present technology.

FIG. 2 illustrates a graphical user interface (GUI) of an industrial automation programming environment in accordance with some embodiments of the present technology. FIG. 2 comprises GUI 200, which is representative of any user interface for writing and editing industrial control code. In some examples, GUI 200 is representative of modeling environment 110 from FIG. 1. GUI 200 includes workspace 210 for writing and editing control code. Workspace 210 includes control logic 220, a current project for control code for an industrial automation process. GUI 200 also includes wizard 230. In the present example, wizard 230 has recommended adding component 231, component 232, link 233, component 234, link 235, and link 236 to control logic 220.

Wizard 230 comprises one or more machine learning models for predicting and/or recommending components for control logic. Wizard 230 may be configured to auto-complete all or a portion of existing control logic in workspace 210. Wizard 230 may alternatively be configured to surface recommendations to add components to existing control logic in workspace 210, wherein the recommendations may be verbal or may display the recommended additions themselves as is shown in the example of FIG. 2. In some examples a user of the engineering environment shown in FIG. 2 selects wizard 230 to trigger it to generate and show recommendations. In other examples, wizard 230 is displayed just to show that the wizard is operating and will automatically surface recommendations as they are generated.

Figure 3:
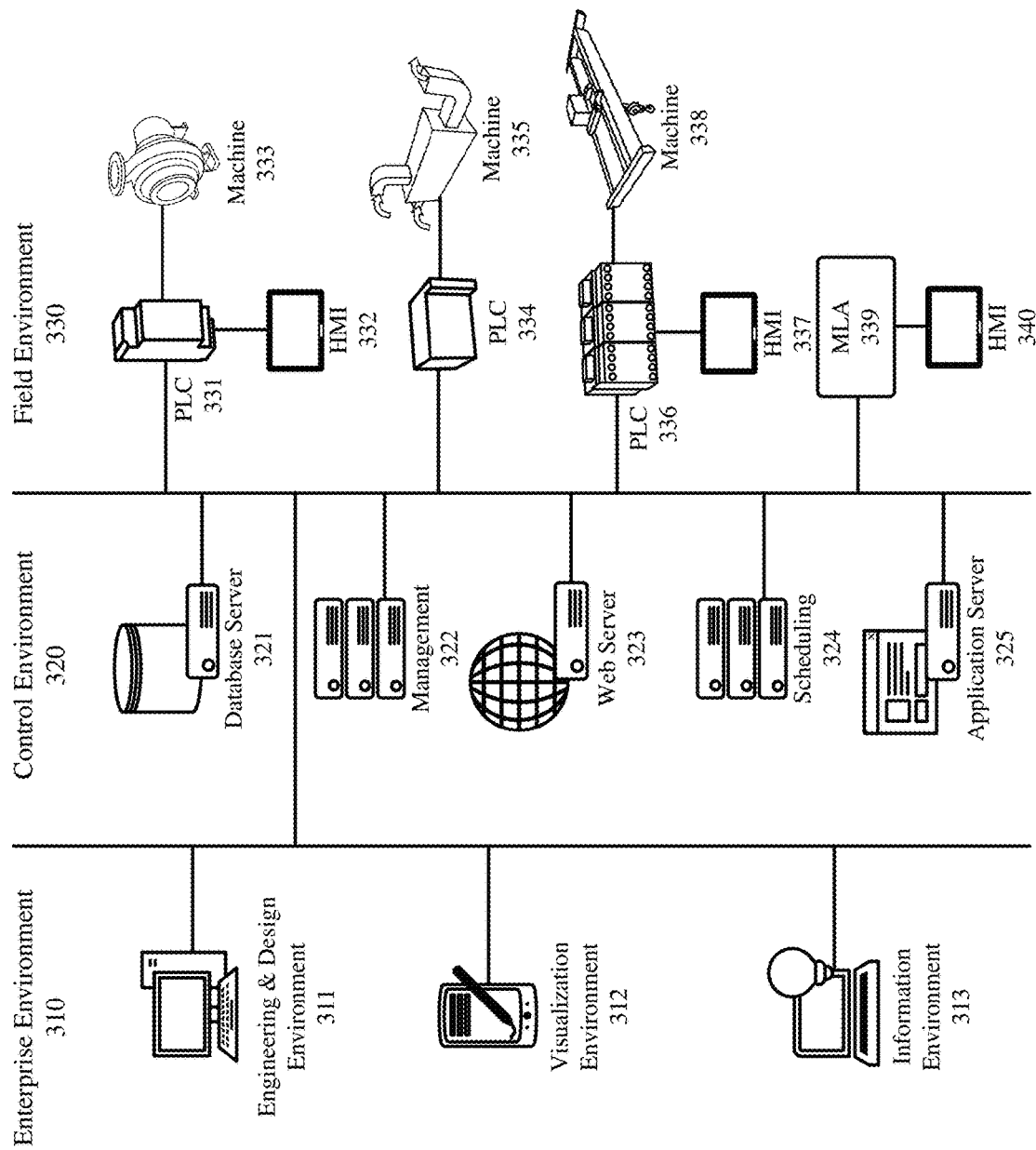
FIG. 3 illustrates an example of an industrial automation environment in which some embodiments of the present technology may be implemented.

FIG. 3 illustrates an example of an industrial automation environment that may be representative of industrial automation environments as discussed herein. The industrial automation environment of FIG. 3 comprises enterprise environment 310, control environment 320, and field environment 330. The industrial automation environment of FIG. 3 may include fewer or additional sub-environments than those shown. Likewise, the sub-environments of the industrial automation environment of FIG. 3 may include fewer or additional components, assets, or connections than shown.

Enterprise environment 310 comprises engineering and design environment 311, visualization environment 312, and information environment 313. Control environment 320 comprises database server 321, management servers 322, web server 323, scheduling server 324, and application server 325. Each of database server 321, management servers 322, web server 323, scheduling server 324, and application server 325 may be representative of a single server or a plurality of servers. Field environment 330 comprises PLC 331, which is coupled to human-machine interface (HMI) 332 and machine 133. Field environment 330 also comprises PLC 334, which is coupled to machine 335. Field environment 330 further comprises PLC 336, which is coupled to HMI 373 and machine 338. Field environment 330 also comprises machine learning asset (MLA) 339, which is coupled to HMI 340.

In some examples, engineering and design environment 311 is representative of any connected devices or environments on which control logic is programmed for operating devices in field environment 330. Visualization environment 312 is representative of any connected devices or environments on which operational data is viewed and/or analyzed. Information environment 313 is representative of any connected devices or environments on the enterprise level on which any other industrial automation information relevant to field environment 330 can be viewed, processed, analyzed, generated, or the like. Assets of control environment 320 are illustrative in nature such that one, none, or any combination of known server types may be in communication with the industrial automation environment of FIG. 3. Similarly, field environment 330 is illustrative in nature such that one, none, or any combination of assets may be present.

Each of PLC 331, PLC 334, and PLC 336 is representative of one or more programmable logic controllers, which may be coupled to one or more devices, machines, sensors, actuators, interfaces, or other asset types. Each of machine 333, machine 335, and machine 338 is representative of any industrial machine relevant to the industrial automation environment of FIG. 3. Each of HMI 332, HMI 337, and HMI 340 is representative of any form of human-machine interface on which a user or operator in field environment 330 can view and/or interact with connected assets.

Machine learning asset 339 is representative of any machine learning model implemented within the industrial automation environment of FIG. 3 as described herein. As previously discussed, machine learning asset 339 may take input from field environment 330 or external sources, such as any server in control environment 320, to generate an output useful to controlling any processes or assets in field environment 330. Machine learning asset 339 may be implemented in a fully closed-loop process or may receive external data for use in generating predictions and/or outputs.

Figure 4:
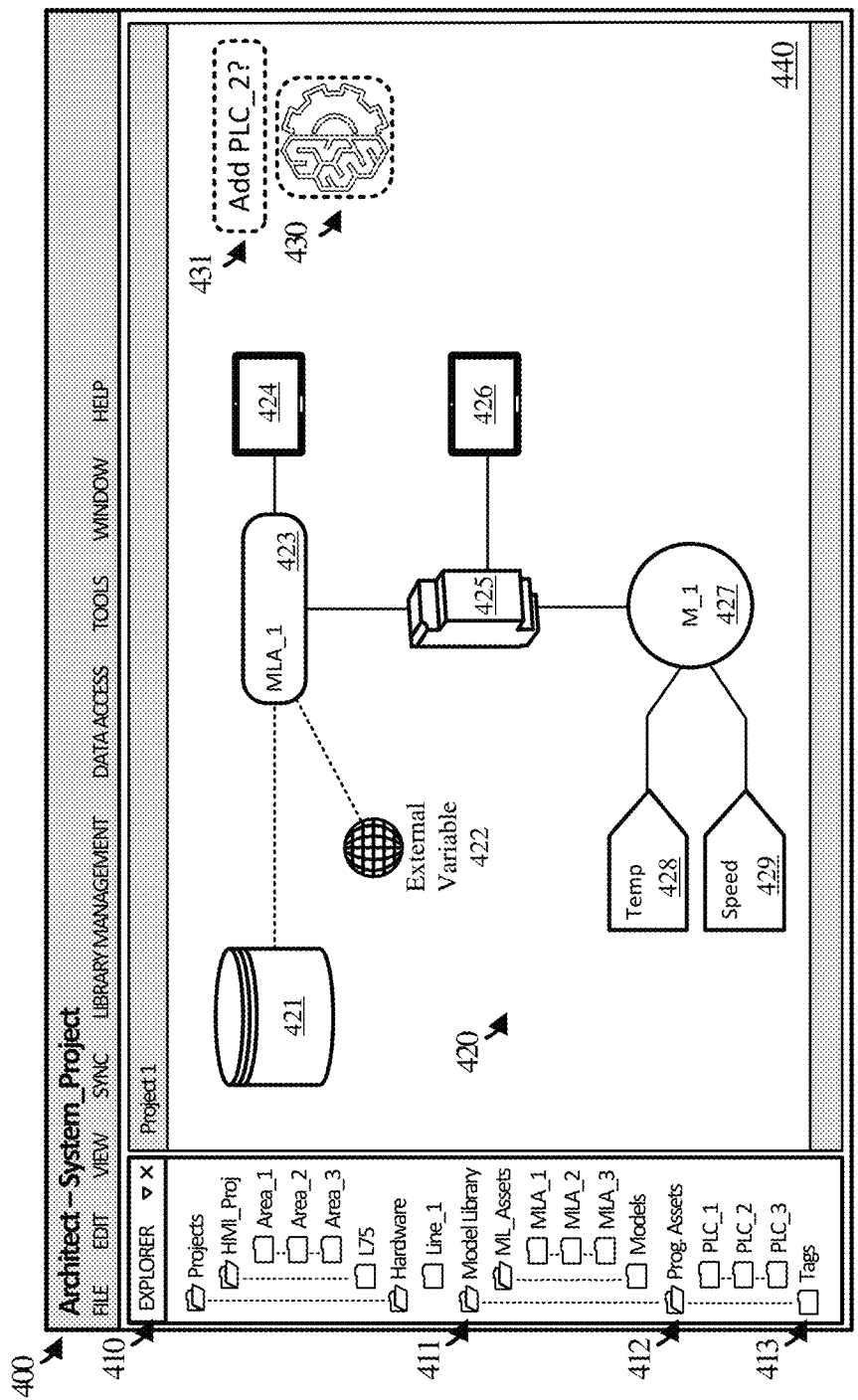
FIG. 4 illustrates a user interface environment for programming control logic in accordance with some embodiments of the present technology.

FIG. 4 illustrates an example of a programming environment in which machine learning assets can be programmed into an industrial process. FIG. 4 includes user interface 400, which is representative of any user interface for generating control code. In some examples, user interface 400 is representative of modeling environment 110 from FIG. 1. In some examples, user interface 400 is running in engineering and design environment 311 from FIG. 3. User interface 400 includes explorer 410, wherein explorer 410 comprises industrial asset libraries, the industrial asset libraries including model library 411, programmable assets library 412, and tags library 413. User interface 400 includes workspace 440 comprising industrial line 420. Industrial line 420 includes database 4211, external variable 422, machine learning asset 423, HMI 424, PLC 425, HMI 426, machine 427, temperature sensor 428, and speed sensor 429. User interface 400 further includes wizard 430 and suggestion 431.

In industrial line 420, database 421 and external variable 422 provide input to machine learning asset 423. Database 421 may comprise a model database that is operatively coupled to the industrial line such that machine learning asset 423 can be swapped with other models stored in database 421. External variable 422 may be representative of any external information that may be used as input to machine learning asset 423. Machine learning asset 423 is coupled to HMI 424, which displays information relevant to the status or control of machine learning asset 423. Machine learning asset 423 is coupled to PLC 425, which is coupled to HMI 426. HMI 426 displays information relevant to the status or control of PLC 425. Machine 427 is coupled to and driven by PLC 425. Temperature sensor 428 and speed sensor 429 measure temperature and speed associated with machine 427.

A programmer may develop or edit industrial line 420 within user interface 400 in accordance with the present disclosure. A programmer has access to model library 411 comprising machine learning models that can be used in industrial line 420. A programmer also has access to programmable assets library 412 comprising programmable assets that can be used in industrial line 420. A programmer also has access to tags library 413 comprising tags that can be used in industrial line 420. In some examples, assets may be provided such that a programmer can "drag and drop" assets into their project such as industrial line 420 and connect assets to the existing model in the same way that other assets are typically connected in the programming environment. In some examples, the asset library presents for a user only a list of relevant assets that may be useful based on the control logic or target industrial environment, wherein determining which assets to show in the asset library is achieved via a machine learning engine trained to identify relevant assets based on the industrial environment and/or control logic. In another example, the industrial asset library is accessible to and used by wizard 430 such that the recommendation engine can generate recommendations or auto-completions for the control logic.

Wizard 430 helps integrate models, variables, inputs, tags, and the like into industrial line 420. Wizard 430 is a machine learning-based recommendation and configuration engine that helps choose models, variables, inputs, tags, and the like as well as provides assistance with tag linking and I/O linking. Wizard 430 comprises one or more machine learning models. The one or more machine learning models of the wizard are streamed data to generate predications, wherein the data may come from many different places including the live industrial environment or network databases. In one example, the wizard may provide a user with a "short list" of assets that the engineer may want to add, wherein the short list is a subset of a full list of available assets.

In the present example, wizard 430 has produced suggestion 431, wherein suggestion 431 suggests adding PLC_2 to industrial line 420. In an example, an engineer or programmer may accept the recommendation to add an asset to industrial line 420 in the programming environment. Wizard 430 may then provide a list of tags that are related to the asset, available for linking to the asset, or commonly linked to the asset. Similarly, the engineer may choose to open a truncated list of tags from the library without the use of wizard 430.

Figure 5:
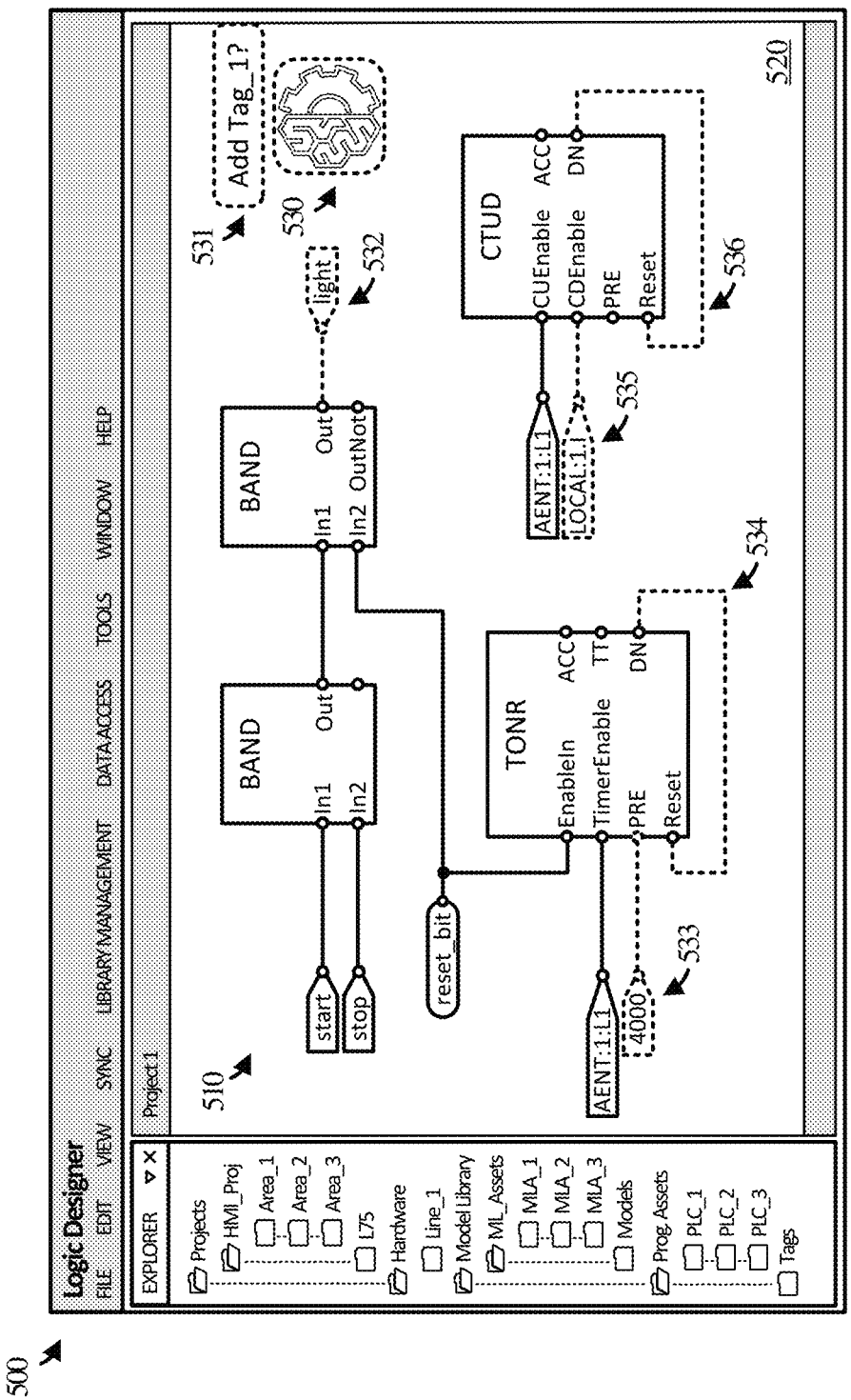
FIG. 5 illustrates a user interface environment for programming control logic in accordance with some embodiments of the present technology.

FIG. 5 illustrates a user interface of an industrial automation programming environment for performing variable relationship discovery in accordance with some embodiments of the present technology. FIG. 5 comprises GUI 500, which is representative of any user interface for writing and editing industrial control code. In some examples, GUI 500 is representative of modeling environment 110 from FIG. 1. In some examples, GUI 500 may be running in engineering and design environment 311 from FIG. 3. GUI 500 includes workspace 520 for writing and editing control code. Workspace 520 includes control logic 510. GUI 500 also includes wizard 530 and recommendation 531. In the present example, wizard 230 has surfaced recommendations to add component 532, component 533, link 534, component 535, and link 536 to control logic 510. Wizard 530 has also surfaced a recommendation to add a tag in recommendation 531.

Wizard 530 is representative of any machine learning-based engine capable of recommending industrial components for control code. In some examples wizard 230 consumes data from existing control code (i.e., control logic 510) in the IDE to create suggestions and automatic completions as shown in the present example. As an automation engineer writes control logic, the wizard 530 may suggest useful or relevant tags or surface relevant data in the context of control logic 510. Wizard 530, in some embodiments, uses historical operational data to inform suggestions it makes in the IDE.

Variable relationship discovery, in accordance with the present example, includes the use of machine learning models (i.e., those within wizard 530) for finding correlations between variables to help discover potentially useful variables, models, or components for an industrial line. Wizard 530 may serve as a relationship discovery engine comprising one or more machine learning models used to analyze control logic 510 and consume data to identify which variables have a large impact on the process and important variable relationships. The data consumed may, in some embodiments, include operational data. Wizard 530 may be used to identify a variable that is heavily used in an associated industrial process but is not being used in control logic 510. Wizard 530 thus surfaces recommendation 531 alerting the user that the variable has been potentially overlooked and recommends the inclusion of the variable.

In some examples, wizard 530 is used to recommend the insertion of a loop, a function, a variable, or the like as well as input to the component and assist with configuring and/or connecting the component in the control code. Conversely wizard 530 may identify that a variable that is heavily used in the control code is absent or under-used in the data pipeline, suggesting that its inclusion in the pipeline and model may yield better predictions.

Figure 6:
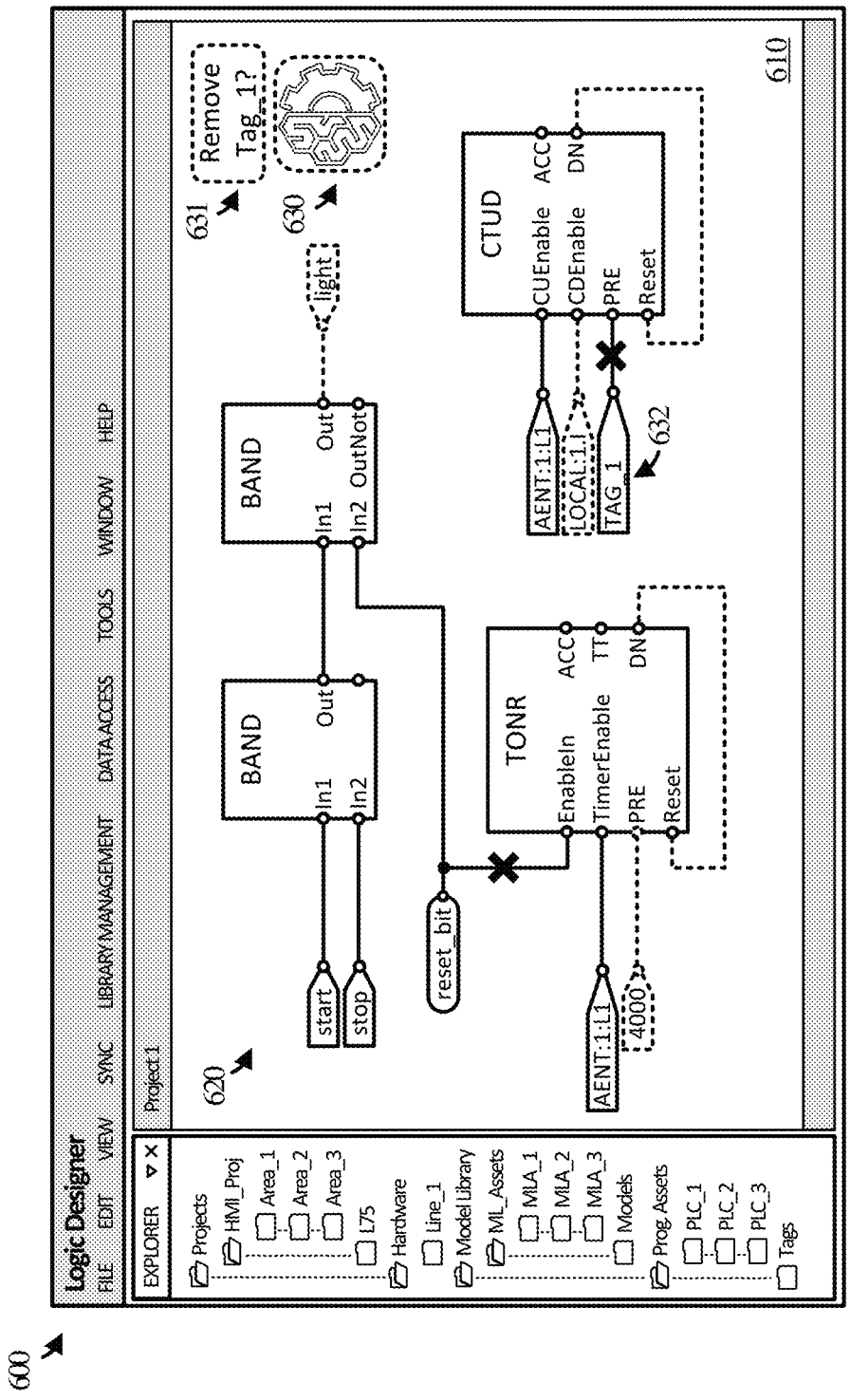
FIG. 6 illustrates a user interface environment for programming control logic in accordance with some embodiments of the present technology.

FIG. 6 illustrates a user interface of an industrial automation programming environment for performing variable reduction in accordance with some embodiments of the present technology. FIG. 6 comprises GUI 600, which is representative of any user interface for writing and editing industrial control code. In some examples, GUI 600 is representative of modeling environment 110 from FIG. 1. In some examples, GUI 500 may be running in engineering and design environment 311 from FIG. 3. GUI 600 includes workspace 610, wherein workspace 610 comprises control logic 620 comprising tag 632. GUI 600 further comprises wizard 630 and recommendation 631. Wizard 630 is a machine learning-based engine comprising one or more machine learning models that may be used to inform, during a programming session, that a variable in the control program is not commonly used, is not generally useful, or is not useful in the particular industrial line based on historical process data. Wizard 630 may therefore recommend removing the variable from the control logic or automatically analyze datasets for extraneous data and eliminate the data from the pipeline.

In the example of FIG. 6, wizard 630 has recommended removing tag 632, wherein the recommendation is expressed in a verbal format in recommendation 631 as well as with an indicator at tag 632 that it should be removed. In an example, a user of the programming environment may accept the recommendation to remove tag 632. In some embodiments, acceptance of the recommendation may include manually removing tag 632. In other embodiments, accepting the recommendation may include selecting a button to select the recommendation, at which time wizard 630 may remove tag 632 itself.

Figure 7:
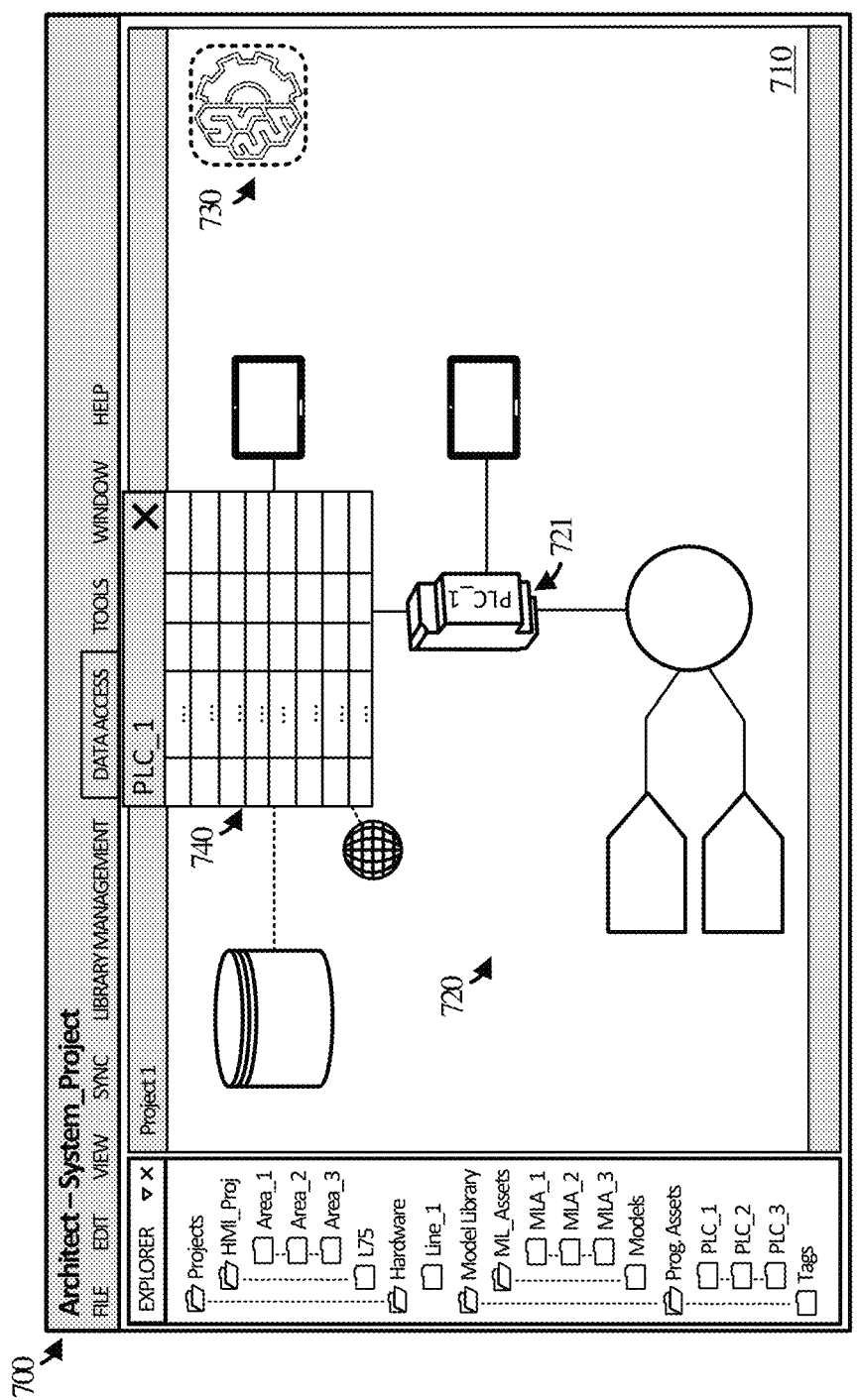
FIG. 7 illustrates a user interface environment for programming control logic in accordance with some embodiments of the present technology.

FIG. 7 illustrates a user interface environment of an industrial automation programming environment integrated with an industrial data science environment. FIG. 7 includes GUI 700. GUI 700 includes workspace 710 comprising control logic 720, wherein control logic 720 comprises PLC 721. GUI 700 further includes wizard 730. GUI 700 further includes data table 740, wherein data table 740 comprises operational data related to PLC 721 of control logic 720. A user of the programming environment shown in FIG. 7 has used the "data access" menu to access operational data from PLC 721. However, in other embodiments, operational data may be surfaced in response to selection of PLC 721 in the GUI or may be automatically surfaced in some circumstances. The operational data related to PLC 721 is shown in a tabular format in the present example. However, operational data may be presented in a variety of ways including tables, charts, graphs, raw data format, data pipelines, or similar.

In addition to the presentation of operational data, the technology herein provides for access to data science tools, such that an automation engineer working in GUI 700 may perform analyses or use the operational data to extract information useful to their engineering tasks.

In an exemplary embodiment, data table 740 is surfaced as a result of actions taken by wizard 730. Wizard 730, in some examples, employs one or more machine learning models to find data relevant to control logic 720 and present the data in a way that may be useful or provide context for the automation engineer. Moreover, wizard 730 may, based on the operational data presented in data table 740, make one or more recommendations to add or remove inputs or outputs from PLC 721.

Figure 8:
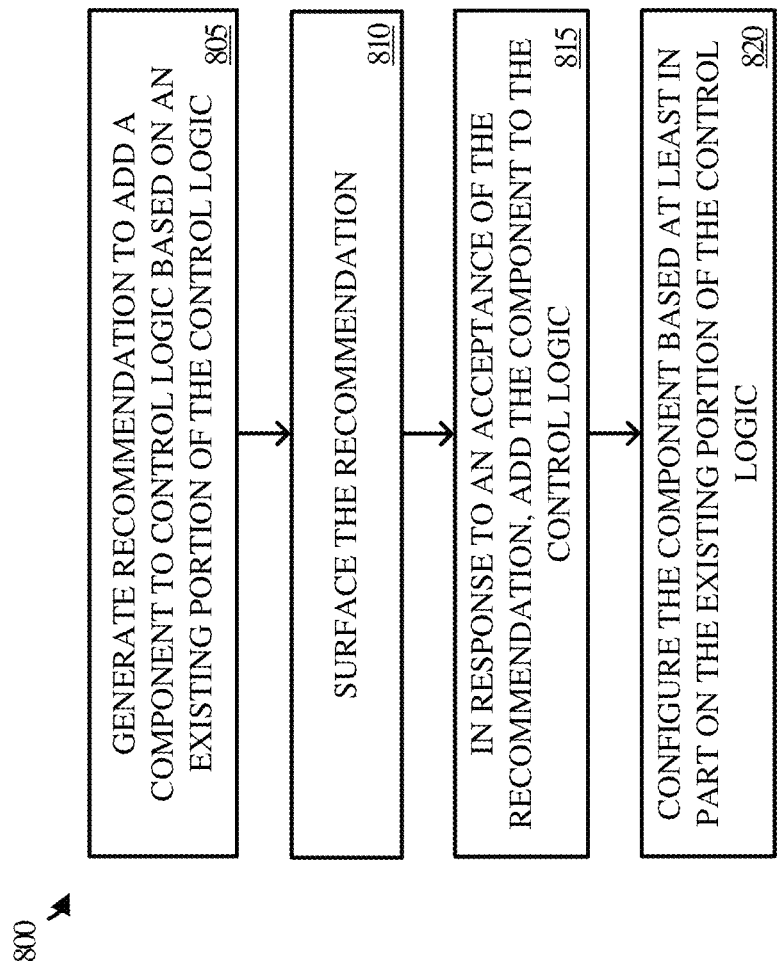
FIG. 8 illustrates a series of steps for utilizing machine learning in industrial automation programming environments in accordance with some embodiments of the present technology.

FIG. 8 illustrates process 800 performed by a computing system for using an industrial programming wizard to assist writing or editing control logic for controlling industrial automation processes. Step 805 comprises, in a machine learning-based recommendation engine, generating a recommendation to add a component to the control logic based on an existing portion of the control logic. In generating the recommendation, the machine learning-based recommendation engine may employ one or more machine learning models to find that the component should be used or is typically used in similar environments. In step 810, a notification component surfaces the recommendation to add the component to the control logic in a user interface of the programming environment. In response to noticing the recommendation, a user may choose to accept or decline the recommendation to add the component.

In step 815, in response to an acceptance of the recommendation, a programming component adds the component to the control logic. Once the component has been added to the control logic, it may require configuration in order to work properly in the intended environment. In step 820, a configuration component configures the component based at least in part on the existing portion of the control logic. In some examples, configuring the component may include the configuration component and/or the machine learning-based recommendation engine guiding the user through configuration of the component.

Figure 9:
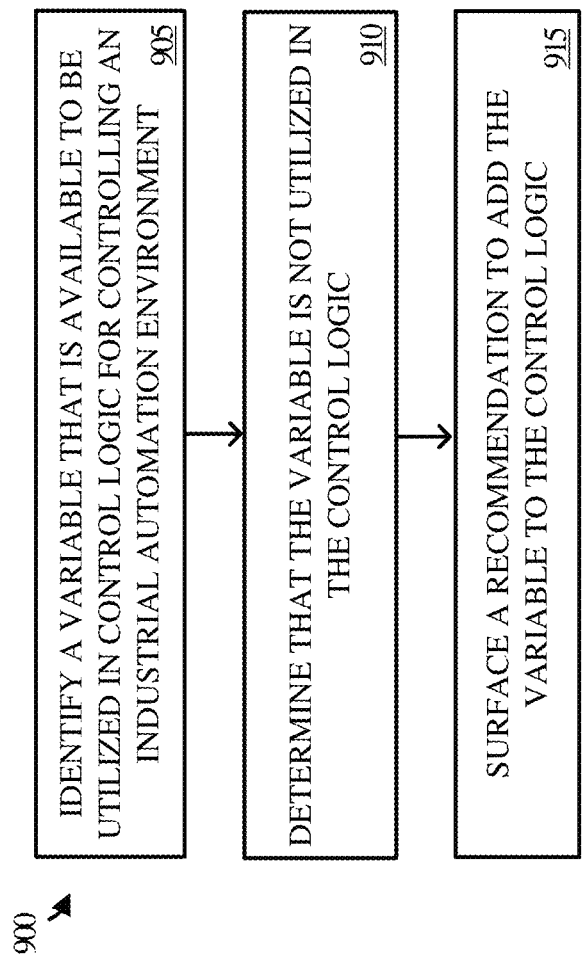
FIG. 9 illustrates a series of steps for utilizing machine learning in industrial automation programming environments in accordance with some embodiments of the present technology.

FIG. 9 illustrates process 900 performed by a computing system for performing variable relationship discovery to assist writing or editing control logic for controlling an industrial automation process. In step 905, a machine learning-based analysis engine identifies a variable that is available to be utilized in the control logic for controlling an industrial automation environment. In some examples of step 905, identifying a variable that is available to be utilized comprises finding that the variable that is heavily used in an associated industrial process but is not being used in the control logic. In other examples of step 905, identifying the variable comprises accessing a control code repository and concluding that the variable is often used in the same or similar programs. In step 910, the machine learning-based analysis engine determines that the variable is not utilized in the control logic. Alternatively, step 910 may comprise determining that the variable is under-utilized in the control logic. In step 915, a recommendation component surfaces a recommendation to add the variable to the control logic. Process 900 may further include receiving an acceptance or rejection of the recommendation and adding the variable to the control logic.

Figure 10:
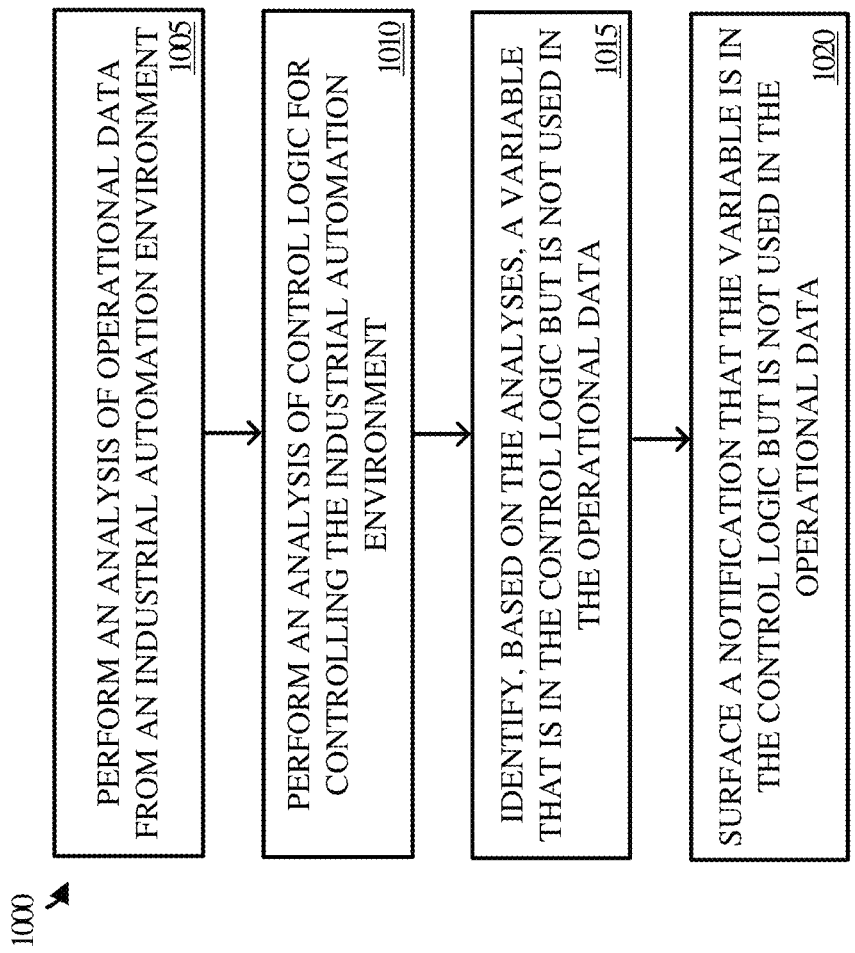
FIG. 10 illustrates a series of steps for utilizing machine learning in industrial automation programming environments in accordance with some embodiments of the present technology.

FIG. 10 illustrates process 1000 performed by a computing system for performing variable reduction to assist in editing control logic for controlling an industrial automation process. In step 1005, a machine learning-based analysis engine performs an analysis of operational data from an industrial automation environment. In step 1010, the machine learning-based analysis engine performs an analysis of the control logic for controlling the industrial automation environment. In step 1015, the machine learning-based analysis engine identifies, based on the analysis of the operational data and the analysis of the control logic, a variable that is in the control logic but is not used in the operational data. In step 1020, a notification component surfaces a notification that the variable is in the control logic but is not used in the operational data. In some examples, the notification that the variable is in the control logic but is not used in the operational data includes a recommendation to remove the variable from the control logic. Process 1000 may further include receiving an acceptance or rejection of a recommendation to remove the variable and removing the variable from the control logic.

Figure 11:
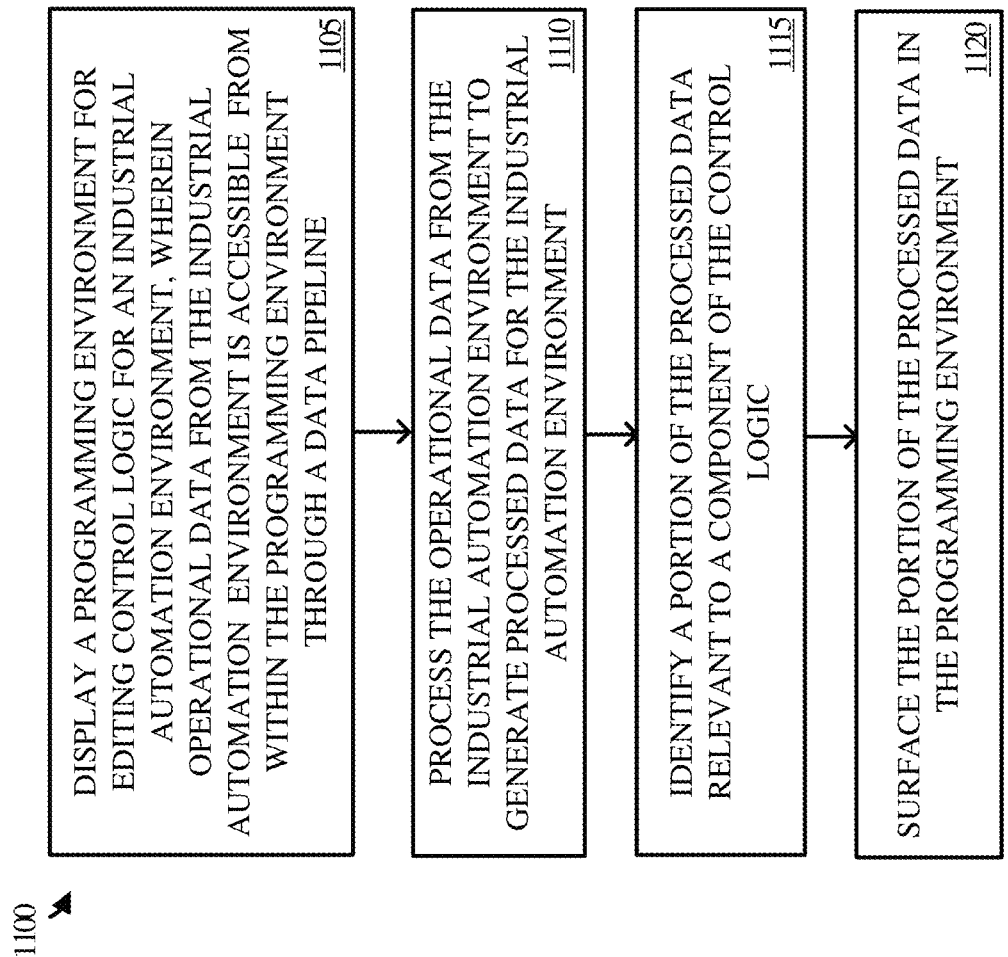
FIG. 11 illustrates a series of steps for utilizing machine learning in industrial automation programming environments in accordance with some embodiments of the present technology.

FIG. 11 illustrates process 1100 performed by a computing system for providing contextual data in an industrial programming environment associated with an industrial automation environment. In step 1105, a user interface component displays the programming environment for editing control logic associated with an industrial automation environment, wherein the operational data from the industrial automation environment is accessible from within the programming environment through a data pipeline. In step 1110, a machine learning-based data science engine processes the operational data from the industrial automation environment to generate processed data for the industrial automation environment, wherein processed data may include any data that is formatted and presented in a useful way to a user of the programming environment. In step 1115, the machine learning-based data science engine identifies a portion of the processed data relevant to a component of the control logic. In step 1120, the user interface surfaces the portion of the processed data in the programming environment.

Figure 12:
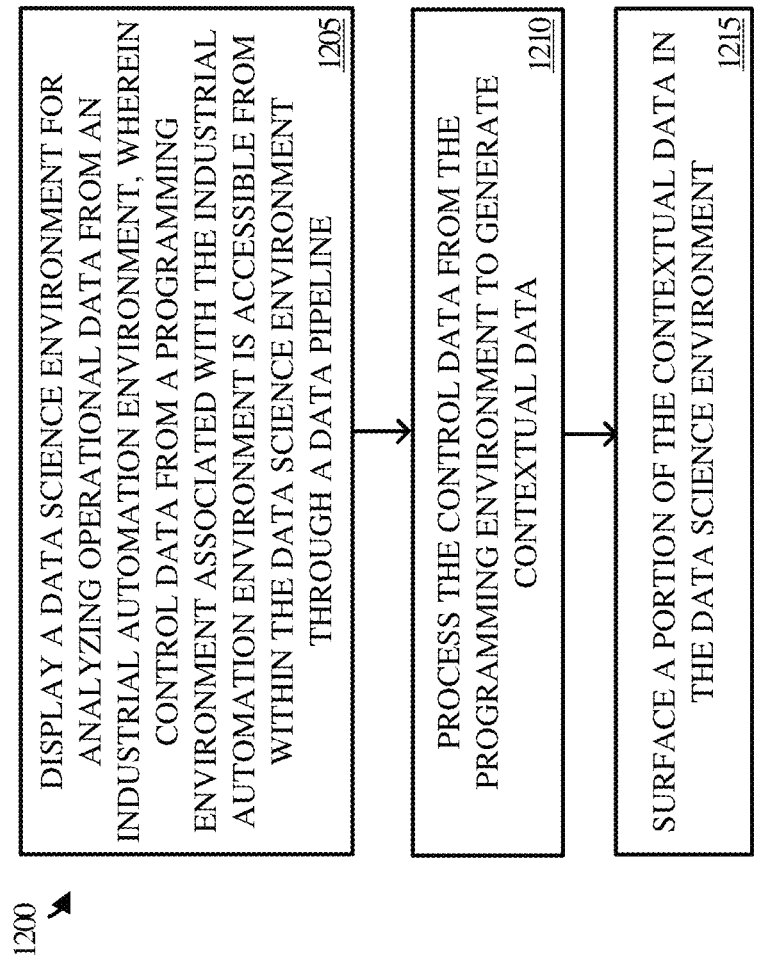
FIG. 12 illustrates a series of steps for utilizing machine learning in industrial automation data science environments in accordance with some embodiments of the present technology.

FIG. 12 illustrates process 1200 performed by a computing system for providing contextual data in a data science environment associated with an industrial automation environment. In step 1205, a user interface component displays a data science environment for analyzing operational data from an industrial automation environment, wherein control data from a programming environment associated with the industrial automation environment is accessible from within the data science environment through a data pipeline. In step 1210, a machine learning-based context engine processes the control data from the programming environment to generate contextual data. In step 1215, the user interface component surfaces a portion of the contextual data in the data science environment. In some examples, the contextual data comprises a model or similar rendering of the control code or a portion of the control code as it may be displayed in the programming environment.

Figure 13:
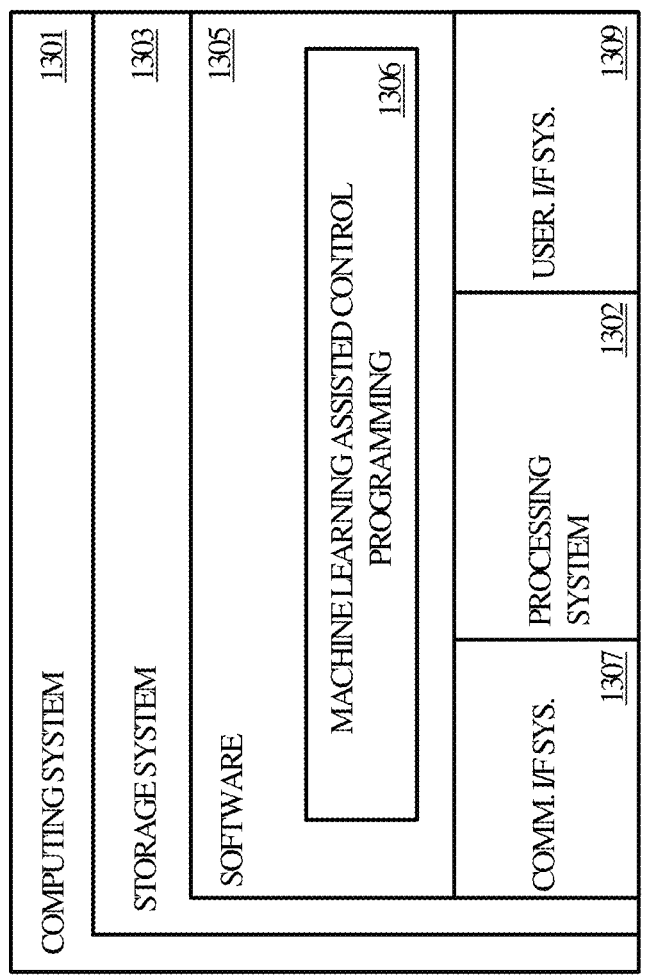
FIG. 13 illustrates an example of a computing device that may be used in accordance with some embodiments of the present technology.

FIG. 13 illustrates computing system 1301 to perform machine learning assisted programming and data analytics according to an implementation of the present technology. Computing system 1301 is representative of any system or collection of systems with which the various operational architectures, processes, scenarios, and sequences disclosed herein for utilizing machine learning models within industrial programming and data science environments may be employed. Computing system 1301 may be implemented as a single apparatus, system, or device or may be implemented in a distributed manner as multiple apparatuses, systems, or devices. Computing system 1301 includes, but is not limited to, processing system 1302, storage system 1303, software 1305, communication interface system 1307, and user interface system 1309 (optional). Processing system 1302 is operatively coupled with storage system 1303, communication interface system 1307, and user interface system 1309.

Processing system 1302 loads and executes software 1305 from storage system 1303. Software 1305 includes and implements machine learning assisted control programming 1306, which is representative of any of the programming and analytic processes discussed with respect to the preceding Figures, including but not limited to industrial asset libraries, wizards, variable relationship discovery, and variable reduction. When executed by processing system 1302 to provide model implementation functions, software 1305 directs processing system 1302 to operate as described herein for at least the various processes, operational scenarios, and sequences discussed in the foregoing implementations. Computing system 1301 may optionally include additional devices, features, or functionality not discussed for purposes of brevity.

Referring still to FIG. 13, processing system 1302 may comprise a micro-processor and other circuitry that retrieves and executes software 1305 from storage system 1303. Processing system 1302 may be implemented within a single processing device but may also be distributed across multiple processing devices or sub-systems that cooperate in executing program instructions. Examples of processing system 1302 include general purpose central processing units, graphical processing units, application specific processors, and logic devices, as well as any other type of processing device, combinations, or variations thereof.

Storage system 1303 may comprise any computer readable storage media readable by processing system 1302 and capable of storing software 1305. Storage system 1303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1303 may also include computer readable communication media over which at least some of software 1305 may be communicated internally or externally. Storage system 1303 may be implemented as a single storage device but may also be implemented across multiple storage devices or sub-systems co-located or distributed relative to each other. Storage system 1303 may comprise additional elements, such as a controller, capable of communicating with processing system 1302 or possibly other systems.

Software 1305 (including machine learning assisted control programming 1306) may be implemented in program instructions and among other functions may, when executed by processing system 1302, direct processing system 1302 to operate as described with respect to the various operational scenarios, sequences, and processes illustrated herein. For example, software 1305 may include program instructions for performing variable reduction in control logic for industrial automation environments as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1305 may include additional processes, programs, or components, such as operating system software, virtualization software, or other application software. Software 1305 may also comprise firmware or some other form of machine-readable processing instructions executable by processing system 1302.

In general, software 1305 may, when loaded into processing system 1302 and executed, transform a suitable apparatus, system, or device (of which computing system 1301 is representative) overall from a general-purpose computing system into a special-purpose computing system customized to provide machine learning functionality to industrial programming and data science environments as described herein. Indeed, encoding software 1305 on storage system 1303 may transform the physical structure of storage system 1303. The specific transformation of the physical structure may depend on various factors in different implementations of this description. Examples of such factors may include, but are not limited to, the technology used to implement the storage media of storage system 1303 and whether the computer-storage media are characterized as primary or secondary storage, as well as other factors.

For example, if the computer readable storage media are implemented as semiconductor-based memory, software 1305 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1307 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1301 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

While some examples provided herein are described in the context of a firmware extension development or deployment device, it should be understood that the condition systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system comprising:
a memory that stores executable components; and
a processor, operatively coupled to the memory, that executes the executable components, the executable components comprising:
a user interface component that displays control logic in an icon-based graphical user interface;
a machine learning-based analysis engine comprising at least one machine learning model, the machine learning-based analysis engine configured to:
analyze an input comprising operational data and the control logic, wherein the operational data is generated by an industrial automation environment having controllers executing the control logic, and wherein the control logic includes instructions executed by the controllers for performing operations in the industrial automation environment, and
identify, based on the analysis of the input, a variable in the control logic that is not of use in the industrial automation environment based on the operational data;
a notification component configured to surface, in the graphical user interface, a recommendation to remove the variable from the control logic based on the machine learning-based analysis engine identifying the variable; and
a programming component configured to, in response to an input accepting the recommendation to remove the variable from the control logic, remove the variable from the control logic.

2. The system of claim 1, wherein the recommendation to remove the variable from the control logic comprises a notification presented in the graphical user interface for editing the control logic.

3. The system of claim 1, wherein the executable components further comprise a determination component configured to determine that the recommendation should be surfaced based on a frequency of utilization of the variable in other control logic for controlling industrial automation environments of a same type as the industrial automation environment.

4. The system of claim 3, wherein the frequency of utilization of the variable is determined based on information derived from one or more control code repositories to which the system is communicatively coupled.

5. The system of claim 1, wherein the at least one machine learning model comprises at least one artificial neural network.

6. The system of claim 1, wherein the operational data is generated at least in part by one or more sensors in the industrial automation environment.

7. A non-transitory computer-readable medium having stored thereon instructions that, in response to execution, cause a system comprising a processor to perform operations, the operations comprising:
in a user interface component, display control logic in an icon-based graphical user interface;
in a machine learning-based analysis engine comprising at least one machine learning model:
analyzing an input comprising operational data and the control logic, wherein the operational data is generated by an industrial automation environment having controllers executing the control logic, and wherein the control logic includes instructions executed by the controllers for performing industrial operations in the industrial automation environment, and identifying, based on the analysis of the input, a variable in the control logic that is not of use in the industrial automation environment based on the operational data;

in a notification component, surfacing, in the graphical user interface, a recommendation to remove the variable from the control logic based on the machine learning-based analysis engine identifying the variable; and the operations further comprising, in response to an input accepting the recommendation to remove the variable from the control logic, removing the variable from the control logic.

8. The non-transitory computer-readable medium of claim 7, wherein the recommendation to remove the variable from the control logic comprises a notification presented in the graphical user interface of an application for editing the control logic.

9. The non-transitory computer-readable medium of claim 7, the operations further comprising determining that the recommendation should be surfaced based on a frequency of utilization of the variable in other control logic for controlling industrial automation environments of a same type as the industrial automation environment.

10. The non-transitory computer-readable medium of claim 9, wherein the frequency of utilization of the variable is determined based on information derived from one or more control code repositories to which the system is communicatively coupled.

11. The non-transitory computer-readable medium of claim 7, wherein the at least one machine learning model comprises at least one artificial neural network.

12. The non-transitory computer-readable medium of claim 7, wherein the operational data is generated at least in part by one or more sensors in the industrial automation environment.

13. A method of recommending removal of variables in an industrial automation programming environment, the method comprising:

displaying, by a system comprising a processor, control logic in an icon-based graphical user interface;

analyzing, by a system comprising a processor, an input comprising operational data and the control logic, wherein the operational data is generated by an industrial automation environment having controllers executing the control logic, and wherein the control logic includes instructions executed by the controllers for performing operations in the industrial automation environment;

identifying, by the system and based on the analysis of the input, a variable in the control logic that is not of use in the industrial automation environment based on the operational data;

surfacing, by the system and in the graphical user interface, a recommendation to remove the variable from the control logic based on the identifying the variable; and the method further comprising, in response to an input accepting the recommendation to remove the variable from the control logic, removing, by the system, the variable from the control logic.

14. The method of claim 13, wherein the recommendation to remove the variable from the control logic comprises a notification presented in the graphical user interface for editing the control logic.

15. The method of claim 13, further comprising determining that the recommendation should be surfaced based on a frequency of utilization of the variable in other control logic for controlling industrial automation environment of a same type as the industrial automation environment.

16. The method of claim 15, wherein the frequency of utilization of the variable is determined based on information derived from one or more control code repositories to which the system is communicatively coupled.

17. The method of claim 13, wherein the operational data is generated at least in part by one or more sensors in the industrial automation environment.

\* \* \* \* \*